(12) United States Patent
Ericson, IV

(10) Patent No.: US 8,615,224 B2
(45) Date of Patent: Dec. 24, 2013

(54) METHOD AND APPARATUS FOR PROVIDING RINGTONE SCHEDULING

(75) Inventor: Eric W. Ericson, IV, North Richland Hills, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1074 days.

(21) Appl. No.: 11/617,979

(22) Filed: Dec. 29, 2006

(65) Prior Publication Data

US 2008/0159522 A1    Jul. 3, 2008

(51) Int. Cl.
*H04M 3/493* (2006.01)
*H04W 24/00* (2009.01)

(52) U.S. Cl.
USPC ............... 455/418; 455/414.2; 455/456.1

(58) Field of Classification Search
USPC ........ 455/418, 404.2; 340/573.1; 379/142.01, 379/211; 709/207
See application file for complete search history.

(56) References Cited

U.S. PATENT DOCUMENTS

| | | | |
|---|---|---|---|
| 2005/0050151 A1* | 3/2005 | Mitchell et al. | 709/207 |
| 2005/0219055 A1* | 10/2005 | Takai et al. | 340/573.1 |
| 2005/0276407 A1* | 12/2005 | Mohler | 379/211.01 |
| 2006/0052091 A1* | 3/2006 | Onyon et al. | 455/415 |
| 2006/0109811 A1* | 5/2006 | Schotten et al. | 370/328 |
| 2006/0211443 A1* | 9/2006 | Wegman | 455/550.1 |
| 2006/0233335 A1* | 10/2006 | Pfleging et al. | 379/142.02 |
| 2007/0053335 A1* | 3/2007 | Onyon et al. | 370/338 |
| 2007/0263807 A1* | 11/2007 | Kraft | 379/142.01 |
| 2007/0287437 A1* | 12/2007 | Cartmell | 455/414.3 |

* cited by examiner

*Primary Examiner* — Nizar Sivji

(57) ABSTRACT

An approach is provided for scheduling of ringtones. A ringtone schedule is stored for specifying information for invoking a plurality of ringtones, wherein one of the ringtones is selected for playout by a mobile device according to the ringtone schedule.

15 Claims, 7 Drawing Sheets

| TIME | DAY | RINGTONE |
|---|---|---|
| 8:00AM-5:30PM | M-F | TONE 1 |
| 5:31AM-9:00PM | M-F | TONE 2 |
| 9:01PM-7:59PM | M-F | TONE 3 |
| ALL | SAT. & SUN | TONE 2 |

| LOCATION | RINGTONE |
|---|---|
| OFFICE | TONE 1 |
| HOME | TONE 2 |
| LIBRARY | TONE 3 |
| DEFAULT | TONE 4 |
| ... | ... |

METHOD AND APPARATUS FOR PROVIDING RINGTONE SCHEDULING

BACKGROUND INFORMATION

The marketplace has witnessed technological advances enabling not only voice communication, but also messaging, multimedia playback, personal organizers, electronic mail, built-in cameras/camcorders, games, and Internet browsing, as well as access to a host of other applications and services. As such, mobile devices, such as cellular phones, personal digital assistants (PDAs) with telephony capability, laptop/notebook computers, pocket personal computers, etc., pervade throughout modern society for both business and personal use. Accompanying this increased level of lifestyle penetration has been the development of a mobile culture seeking to define its personality through its communication devices. With the ability to decorate, accessorize, or otherwise customize their mobile terminals, users have transformed their communication devices into extensions of their personalities, reflecting their likes and dislikes. Apart from the ability to visually modify the external appearance, users can configure various features within these devices, including, for example, adjusting ringing tone, melody, volume, mode (vibrate, silent, single beep, etc.), providing ring back tones, ensuring call screening/filtering, regulating notification and/or alert methods, as well as controlling other variable features and settings.

Consequently, distinctive ringtones (the sound made by a mobile device to indicate an incoming communication session or other notifications) have become popular with consumer and business customers alike. It is commonplace for a user to select ringtones in form of music or other sound effects. Given the variety of ringtones available, it is noted that certain ringtones may not be appropriate in certain environments. For example, a musical ringtone that has objectionable lyrics may be interesting in a personal setting among friends, but may be viewed as unprofessional in a business setting.

Conventionally, users have to manually alter the ringtone settings among these different environments. However, this process is highly inconvenient and impractical for users, and thus, discourages such users from modifying the ringtone settings. Also, because no convenient approach exists for manipulating multiple ringtones, users who would otherwise want to download a certain ringtone are deterred from doing so because they recognize it would have limited use.

Service providers of ringtones could increase their revenue by making the process more appealing to these types of users, as well as increasing their competitiveness among current adopters of ringtone service.

Therefore, there is a need for conveniently managing multiple ringtones of a mobile device.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 5A and 5B are exemplary ringtone schedules based on time and location, respectively, according to various exemplary embodiments;

DETAILED DESCRIPTION

An apparatus, method, and software for scheduling multiple phone alerts (e.g. ringtones) are described. In the following description, for the purposes of explanation, numerous specific details are set forth in order to provide a thorough understanding of the various exemplary embodiments. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Figure 1:
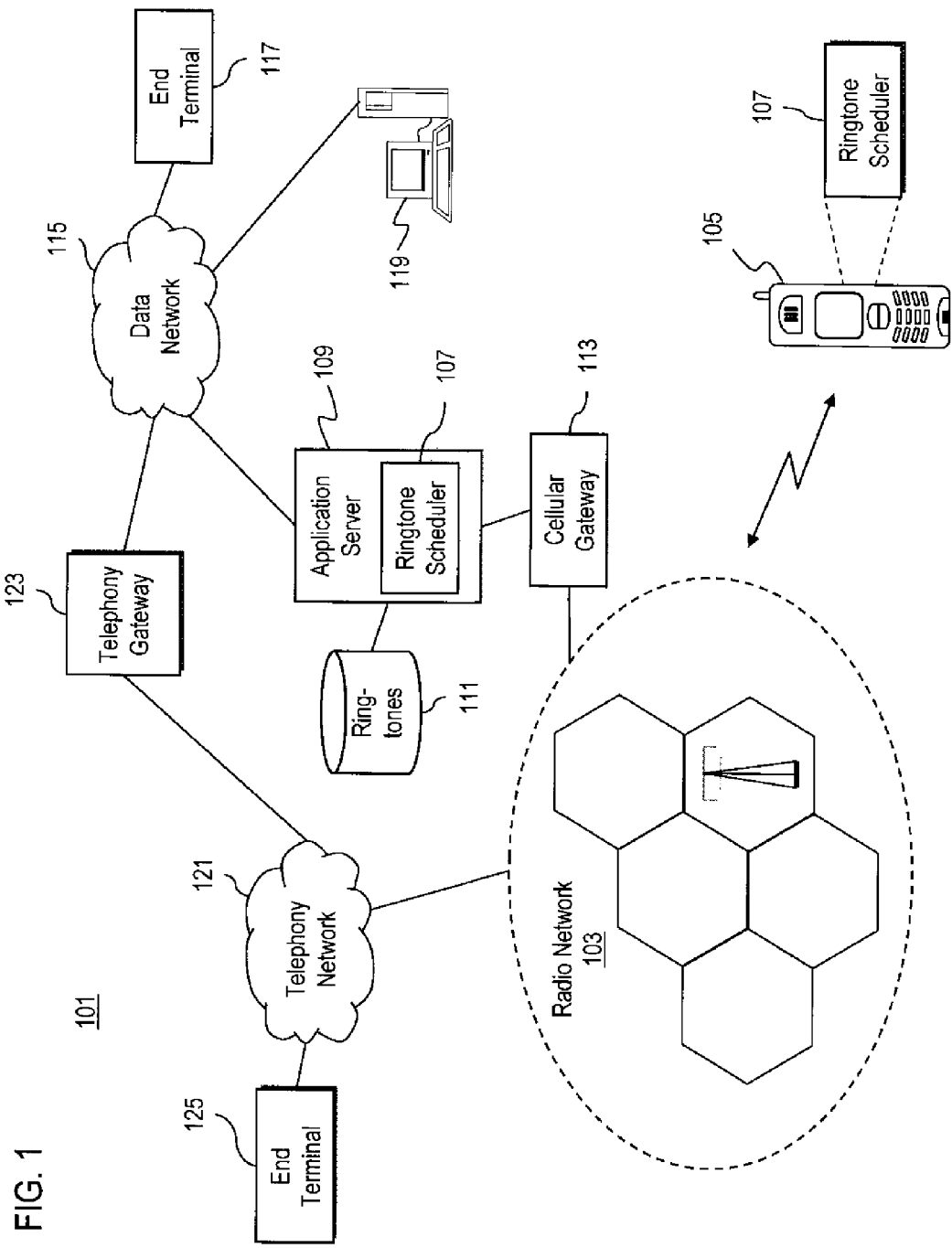
FIG. 1 is a diagram of a communication system capable of providing different ringtones based on ringtone schedule, according with an exemplary embodiment.

FIG. 1 is a diagram of a communication system capable of providing different ringtones based on ringtone schedule, according with an exemplary embodiment. For the purposes of illustration, a mechanism for managing multiple phone alerts (e.g., ringtones) is described with respect to a communication system 101 that includes a radio network 103, such as a cellular network. Phone alerts, such as ringtones, can include a combination of audible, visual, and vibration indicia. A mobile device 105 utilizes a ringtone scheduler 107 that is locally resident within the device 105 for scheduling phone alerts based on, for example, time-of-day and/or location of the device 105. In addition (or alternatively), the ringtone scheduler 107 can reside within on the network-side—e.g., within an application server 109. In this manner, distinctive ringtones can be either network-actuated, (i.e., the supporting communication network transmits the appropriate signal to the mobile device 105), or is actuated by the mobile device 105.

The ringtone scheduler 107 permits a user to select the ringtones to suit the user's schedule, using time and/or place as the triggering mechanism to automatically switch from one ringtone to another ringtone. As alluded to, users enjoying use of the distinctive ringtones have to be even more mindful of proper mobile etiquette to ensure an adequate level of professionalism or appropriateness in every situation. This approach, which is more fully described below with respect to FIGS. 3-6, stems from the recognition that users can be expressive in their selection of ringtones, while maintaining appropriate decorum under different circumstances, e.g., during a business meeting, sitting in church, attending a ceremonial occasion, etc.

Traditionally, to avoid the occurrence of inappropriate or otherwise unprofessional situations, users must constantly remember when and where to manually adjust the particular configurable features of their devices. However, such a burden is often too daunting for users to manage alone. All too often mobile device users forget to adjust their ringtones causing an annoyance or disruption to others. For example, users often forget to change their ringtone volume and/or ringtone mode at movie theaters, fancy restaurants, or when visiting grandma's house. As such, establishment proprietors are constantly having to remind patrons to turn down or turn off their mobile devices altogether.

Further, once users adjust these configurable features to be in accordance with their new environment, they have to also remember to adjust back their mobile station to its original settings. Frequently, it is the case that users forget to re-adjust the parameters causing great frustration especially when the user previously set the mobile station to silent mode resulting in later missed calls, messages, etc. As such, the ringtone scheduler 107 relieves the user of constant manual adjustment, thereby providing automatic control of the distinctive modes of notification on the mobile device 105.

As seen in FIG. 1, the application server 109 has access to a database 111 of ringtones, which can be downloaded by the mobile device 105 via application server 109 and a cellular gateway 113. The application server 109 also has connectivity to a data network 115 that supports an end terminal 117. The end terminal 117 can be any computing device that provides packetized voice applications—e.g., Voice over IP (Internet Protocol).

The data network 115 additionally permits a host 119 to input and modify a ringtone schedule, via a graphical user interface (GUI) such as a browser application or any web-based application, for the mobile device 105. It is contemplated that under one scenario, the user of the mobile device 105 can input and update the user's ringtone schedule through a web browser or through the mobile device 105 itself. Alternatively, the host 119 can run productivity applications, such as a calendar application, to configure the schedule.

The data network 115 communicates with a telephony network 121 using a telephony gateway 123. In this example, the telephony network 121 can provide establishment of a voice connection between end terminal 125 and the end terminal 117 or the mobile device 105.

Although the ringtone scheduling function is described with respect to the mobile device 105, it is recognized that the ringtone function can be applied to any device capable of providing voice communications—e.g., end terminals 117, 125 and host 119. Additionally, other than ringtones, the scheduling approach has applicability to other features, such as ring back tones, for example. A ring back tone is an intermittent audio excerpt provided to a caller while the callee is receiving a ringing signal.

In an exemplary embodiment, the scheduler 107 can provide a "Do Not Disturb" or "Ring Alternate Tone" (if the call is not within a list, dial plan, or call group) mode, in which a user can elect to have calls buffered to a voice mail system (not shown) and be alerted when the user leaves or enters a predetermined zone (i.e., location) if calls are queued. Alternatively, this mode of operation can be triggered based on time.

Figure 2:
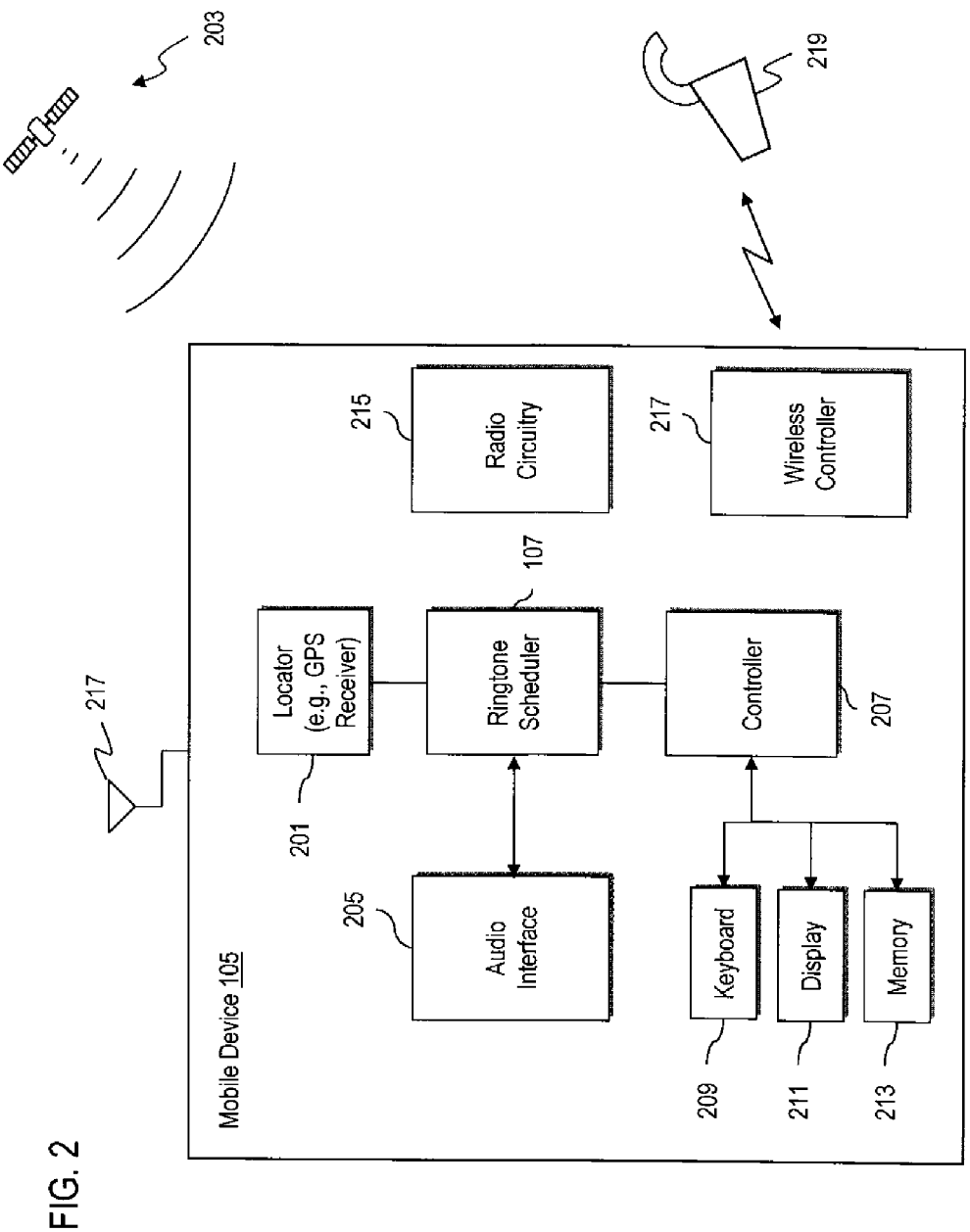
FIG. 2 is a diagram of a mobile device including a ringtone scheduler, according to an exemplary embodiment.

FIG. 2 is a diagram of a mobile device including a ringtone scheduler, according to an exemplary embodiment. In this embodiment, the mobile device 105 includes a locator 201 to determine location of the mobile device 105. By way of example, the locator 201 includes a Global Positioning System (GPS) receiver that receives position data from multiple GPS satellites 203. The position data is utilized by the ringtone scheduler 107 to invoke the appropriate ringtone. The ringtone is played out by an audio interface 205, as part of an audio function circuitry (not shown) that includes a microphone and microphone amplifier that amplifies the speech signal output from the microphone. The amplified speech signal output from the microphone is fed to a coder/decoder (CODEC).

A controller 207 is provided to control functions of a keyboard 209 (or other input mechanisms, e.g., touch screen), a display unit 211, and a memory 213. A user can input ringtone schedule parameters using the keyboard 209. The display unit 211 provides a display to the user in support of various applications and mobile station functions. The memory 213 can store the actual ringtone schedule as well as the ringtones for use by the ringtone scheduler 107.

The ringtone scheduler 107, in one embodiment, in conjunction with the controller 207 designates and controls appropriate distinctive features (e.g., ringtones) on the mobile device 105 for a given set of circumstances, as dictated by a ringtone schedule that may specify user defined parameters include time of day, location of mobile station, type of caller, priority of call, origin of call, or any combination thereof. Hence, the ringtone scheduler 107 utilizes the above parameters (stored in the memory 213) to control how and which ringtones are invoked.

In addition, the mobile device 105 employs radio circuitry 215 to communicate over the radio network 103 (of FIG. 1) using radio frequency (RF) signaling. The radio circuitry 215 can be defined in terms of front-end and back-end characteristics. The front-end of the receiver encompasses all of the RF circuitry whereas the back-end encompasses all of the baseband processing circuitry. For the purposes explanation, voice signals transmitted to the mobile device 105 are received via antenna 217 and immediately amplified by a low noise amplifier (LNA) (not shown). A down-converter lowers the carrier frequency while the demodulator strips away the RF leaving only a digital bit stream. The signal then goes through the equalizer and is processed by a Digital Signal Processor (DSP) (not shown). The DSP may, depending upon the implementation, perform any of a variety of conventional digital processing functions on the voice signals. Additionally, the DSP determines the background noise level of the local environment from the signals detected by microphone and sets the gain of microphone to a level selected to compensate for the natural tendency of the user of the mobile station. A Digital-to-Analog Converter (DAC) (not shown) converts the signal and the resulting output is transmitted to the user through a speaker in the audio interface 205, as controlled of the controller 207.

In use, a user speaks into a microphone and his or her voice, along with any detected background noise, is converted into an analog voltage. The analog voltage is then converted into a digital signal through the Analog-to-Digital Converter (ADC) (not shown). The controller 207 routes the digital signal into the DSP for processing therein, such as speech encoding, channel encoding, encrypting, and interleaving. The encoded signals are then routed to an equalizer for compensation of any frequency-dependent impairments that occur during transmission through the air such as phase and amplitude distortion. After equalizing the bit stream, a modulator (not shown) combines the signal with a RF signal generated in the RF interface. The modulator generates a sine wave by way of frequency or phase modulation, for example. In order to prepare the signal for transmission, an up-converter (not shown) combines the sine wave output from the modulator with another sine wave generated by a synthesizer (not shown) to achieve the desired frequency of transmission. The signal is then sent through a Power Amplifier (PA) (not shown) to increase the signal to an appropriate power level. In practical systems, the PA acts as a variable gain amplifier whose gain is controlled by the DSP from information received from a network base station. The signal is then filtered within the duplexer and optionally sent to an antenna coupler to match impedances to provide maximum power transfer. Finally, the signal is transmitted via antenna to a local base station. An automatic gain control (AGC) (not shown) can be supplied to control the gain of the final stages of the radio circuitry 215. The signals may be forwarded from there to a remote telephone which may be another cellular telephone, other mobile phone or a landline connected to a Public Switched Telephone Network (PSTN), or other telephony networks 121.

Furthermore, the mobile device 105 can optionally be equipped with a wireless controller 217 to communicate with a wireless headset 219. The headset 219 can employ any number of standard radio technology to communicate with the wireless controller 217; for example, the headset 219 can be BLUETOOTH enabled. It is contemplated that other equivalent short range radio technology and protocols can be utilized.

Figure 3:
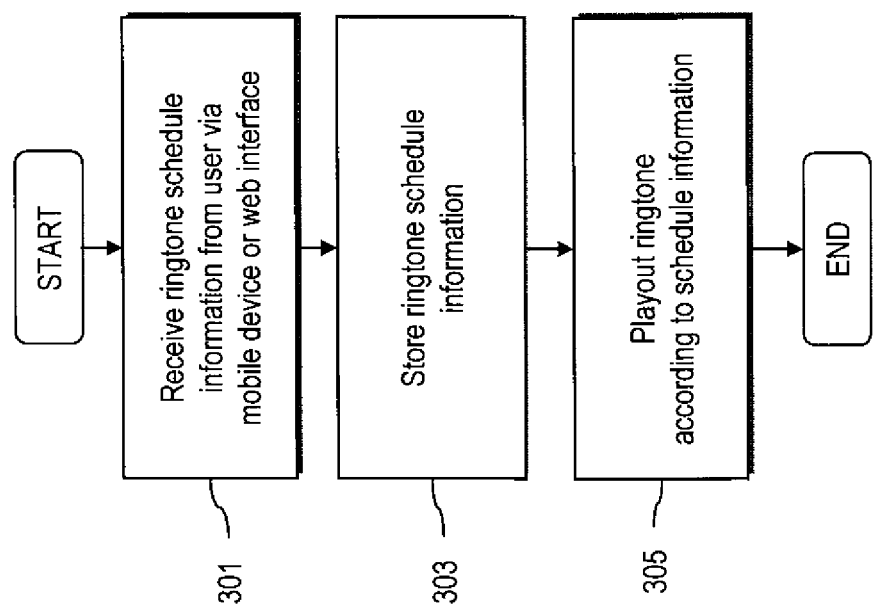
FIG. 3 is a flowchart of a process for receiving ringtone schedule information from a user, according to an exemplary embodiment.
Figure 4:
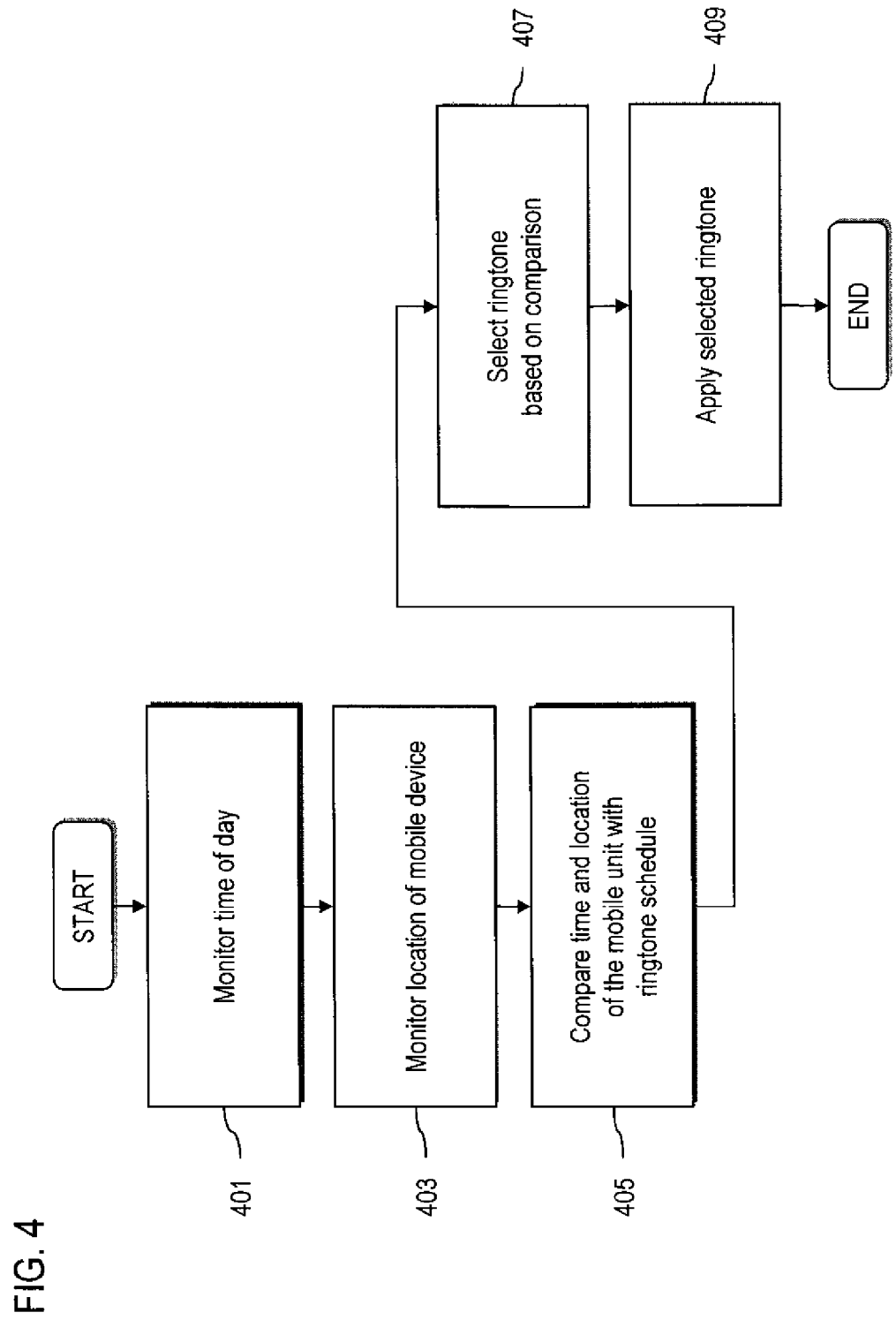
FIG. 4 is a flowchart of a process for automatically setting ringtones according to a ringtone schedule, according to various exemplary embodiments.

The operation of the ringtone scheduler 107 is now described in FIGS. 3 and 4.

FIG. 3 is a flowchart of a process for receiving ringtone schedule information from a user, according to an exemplary embodiment. In step 301, ringtone schedule information (or parameters) are received from the user. According to an exemplary embodiment, the user can input the information using the keyboard 209. In the alternative, this information can be remotely entered by the host 119 using a web browser (FIG. 1). Next, the ringtone schedule information is stored, as in step 303, in the memory 213. In accordance with the ringtone schedule, various ringtones are played out by the audio interface 205, per step 305. To enforce or apply the ringtone schedule, the ringtone scheduler 107 employs a monitoring process for the user specified information to trigger switching among the ringtones, as described in FIG. 4.

FIG. 4 is a flowchart of a process for automatically setting ringtones according to a ringtone schedule, according to various exemplary embodiments. By way of example, the process of ringtone selection is explained to account for time-of-day and location information; it is contemplated that such information can be utilized individually. In step 401, the mobile device 105 monitors the time. Also, the location of the device 105 is monitored using the locator 201, as in step 403. The determined time and location are used to compare with the data specified in the ringtone schedule, per step 405. Thereafter, the ringtone specified for the condition that is satisfied by the time and location is selected for playout (step 407). The selected ringtone is then applied, as in step 409, such that when, for example, a call is received by the mobile device 105, the selected ringtone used by the audio interface 205 to alert the user of the received call.

FIGS. 5A and 5B are exemplary ringtone schedules based on time and location, respectively, according to various exemplary embodiments. With exemplary ringtone schedule 501 of FIG. 5A, only the time-of-day is considered for selection of the ringtones. As shown, the time slot, 8:00 AM-5:30 PM, is reserved for Tone 1, during the business days of Monday through Friday. Tone 1, for instance, can be a non-musical tone that does not attract much attention so that it would not be disruptive in a business setting. Tone 2 occupies time slot 5:31 PM-9:00 PM, and can be tone that coincides with a favorite song. In this example, Tone 2 would be selected for all hours of the weekend (Saturday and Sunday). Further, the user may specify yet another tone, Tone 3, which can correspond to yet another song (perhaps a song that is more subdued as not to startle others, etc.).

As another example, the ringtones can be triggered or invoked based on location of the mobile device 105. This schedule 503 maps ringtones, Tone 1 —Tone 3, to various locations (or zones) of Office, Home, and Library, respectively. In this manner, the ringtone scheduler 107 can switch ringtones as the location of the mobile device 105 changes. Further, the user can specify a default ringtone, when the mobile device 105 is not within any of these locations. This capability is illustrated in FIG. 6.

Figure 6:
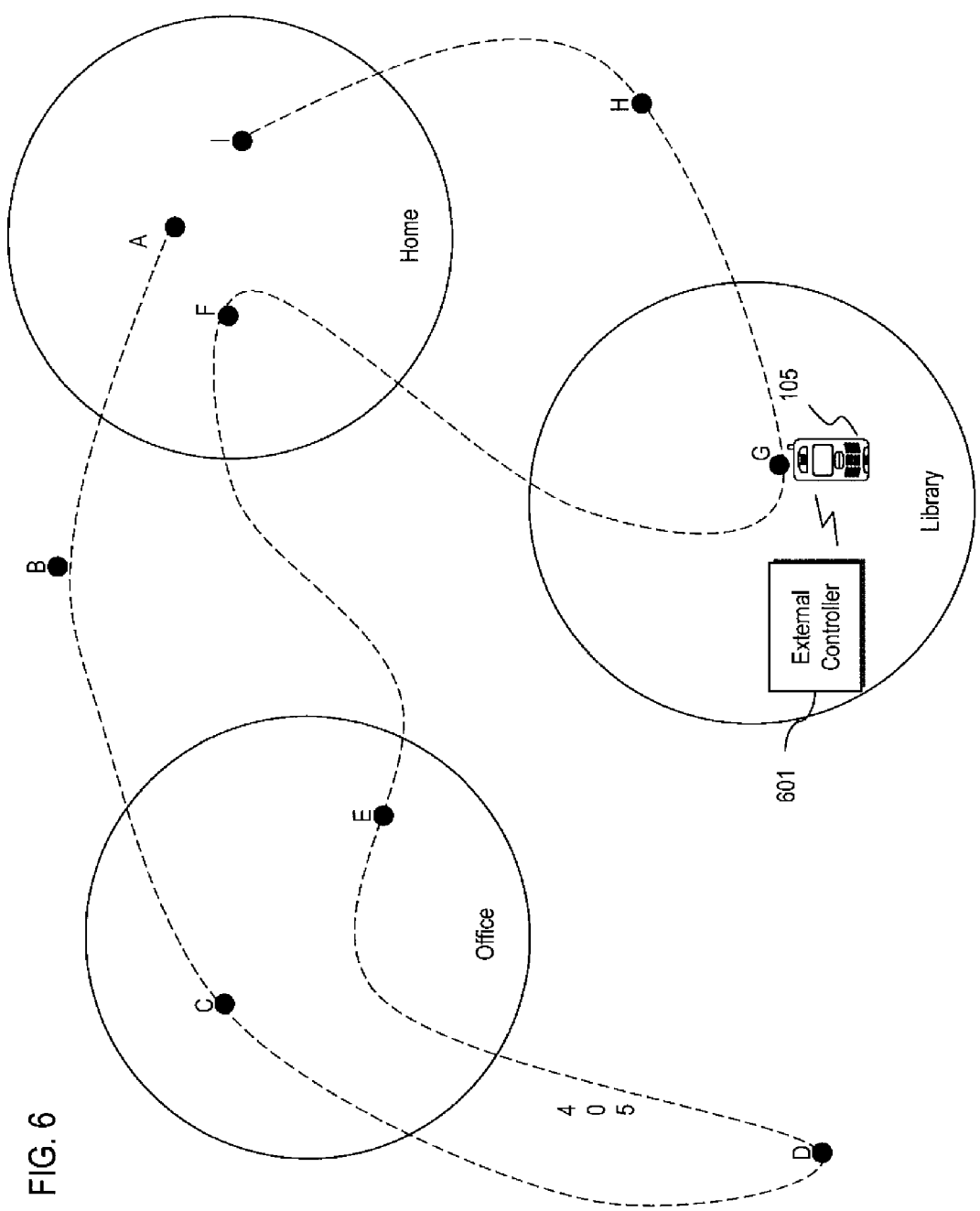
FIG. 6 is a diagram of an exemplary process for monitoring a mobile device to apply an appropriate ringtone, according to an exemplary embodiment.

FIG. 6 is a diagram of an exemplary process for monitoring a mobile device to apply an appropriate ringtone, according to an exemplary embodiment. Under this scenario, the mobile device 105 starts at Home at point A; thus, the device 105 invokes Tone 2. Perhaps on the way to the Office, the user travels to point B to pickup coffee at a local establishment, which triggers the default Tone 4. While at the Office (point C), the ringtone scheduler 107 automatically switches the present ringtone setting to Tone 1 from Tone 4. Now, perhaps the user leaves the Office for lunch to location D, reverting the ringtone selection to Tone 4, the default tone. While back at the Office (point E), the mobile device 105 utilizes Tone 1.

As shown, the mobile device 105 moves to point F, which is in the coverage area designated as Home. Accordingly, the ringtone selection is now Tone 2 (as dictated by the schedule 503). The user now travels to the Library (point G), thereby invoking Tone 3. At point H, the default tone is used. At Home (point I), the mobile device reverts to Tone 2.

It is noted that the areas designated as Office, Home and Library can be predetermined by configurable redial distance from an address specified by the user. Also, it is contemplated that the time-of-day schedule 501 can be used concurrently with the location schedule 503, in which the user can specify which schedule has priority if a conflict occurs.

In another scenario, external signals control the ring tone played for the institutions that require a quiet environment. Alternatively, when the user is in the Library, for instance, a loud ring tone is undesirable as it may disturb other patrons. In such a case, the Library can transmit a local signal, via an external controller 601, to influence the ringtones; the local signal can be BLUETOOTH control signal, for instance. This ability to control the ringtone can itself be a feature that is configured by the scheduler 503. That is, the user can specify the ability or willingness to be externally controlled. The control feature would be toggled ON or OFF while in that environment, and out of the environment would return to a default state.

Furthermore, the scheduler 107 can alert the user if there were missed calls while in this control state upon exiting that controlled state location. The ability to control can be provided as a feature, and thus, can be a revenue source for service providers depending on how the control was established.

Additionally, the scheduler 107 can support, as permitted by the user configuration, advertisements (or coupons) to the mobile device 105 while in that environment, zone, or time period. For example, the scheduler 107 can allow wireless (e.g., BLUETOOTH) advertisements to be received by mobile device 105 based on the environment, zone, or time period; this capability can be set by the end user.

Furthermore, the scheduler 107 could also affect the alerts (e.g., ringtones) when pages or instant messages (IM) are received by the mobile device 105. Effectively the scheduler 107 can be utilized as a part of a parental control for phone usage, if the users are young children, for example. Each of these features can be activated and deactivated based on location and/or time parameters. Namely, general control of the mobile device 105 via the scheduler 107 (e.g., based on time and location) can be applied to parental controls. By way of example, such general control can include: ring tones, ability to dial, ability to call "call groups" (e.g., a dial plan that is restricted, as to the numbers of family members or emergency services, or instant message (IM) control. For example, the scheduler 107 can also affect the alerts (ring tones) when pages or IM's are received by the phone. If a parent determines that a child is always receiving and transmitting instant messages (or text messages) while in school, parental controls can be implemented to prohibit usage of this capability during school hours.

The above described processes relating to ringtone scheduling may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 7:
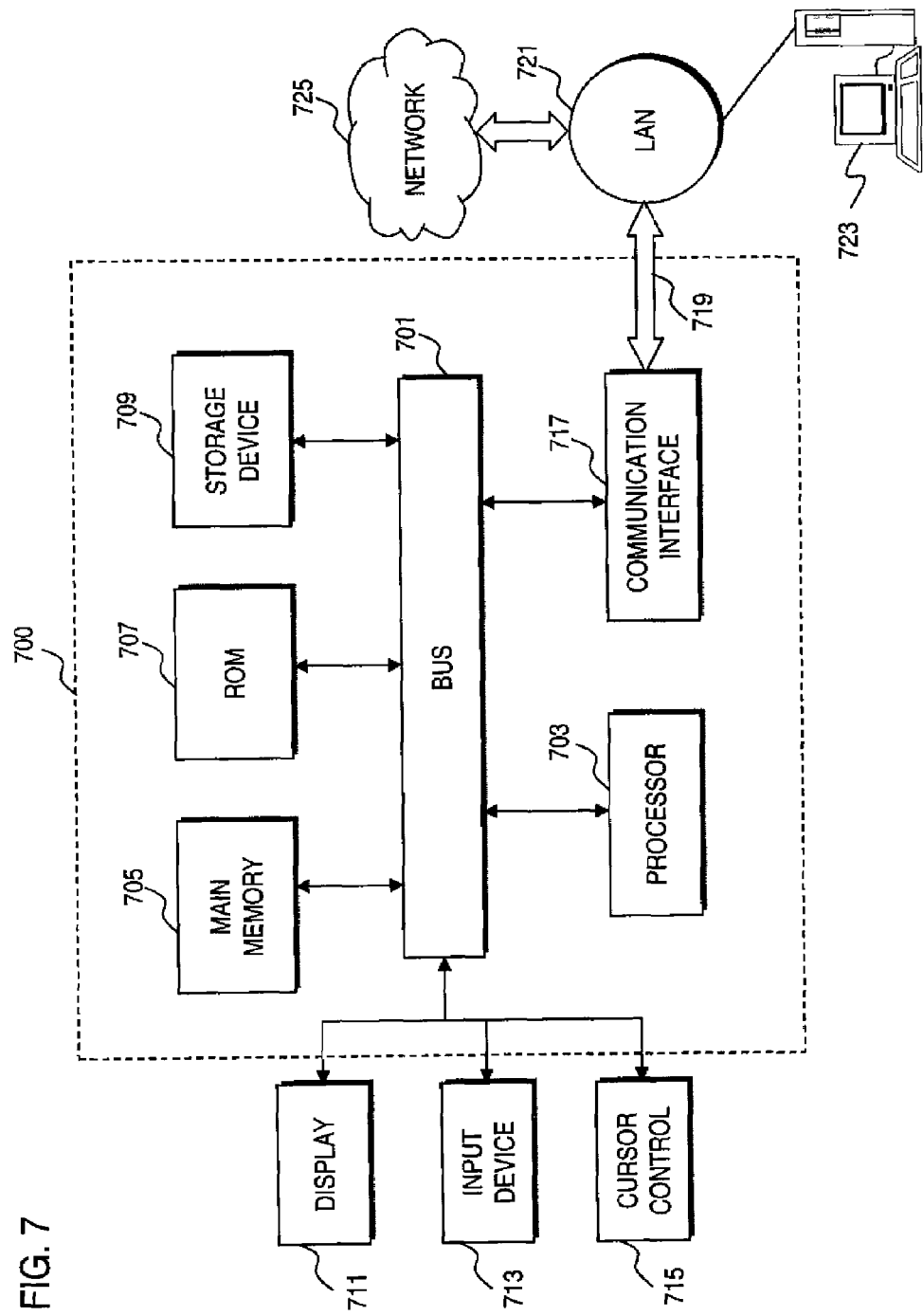
FIG. 7 is a diagram of a computer system that can be used to implement various exemplary embodiments.

FIG. 7 illustrates a computer system 700 upon which an exemplary embodiment can be implemented. For example, the processes described herein can be implemented using the computer system 700. The computer system 700 includes a bus 701 or other communication mechanism for communicating information and a processor 703 coupled to the bus 701 for processing information. The computer system 700 also includes main memory 705, such as a random access memory (RAM) or other dynamic storage device, coupled to the bus 701 for storing information and instructions to be executed by the processor 703. Main memory 705 can also be used for storing temporary variables or other intermediate information during execution of instructions by the processor 703. The computer system 700 may further include a read only memory (ROM) 707 or other static storage device coupled to the bus 701 for storing static information and instructions for the processor 703. A storage device 709, such as a magnetic disk or optical disk, is coupled to the bus 701 for persistently storing information and instructions.

The computer system 700 may be coupled via the bus 701 to a display 711, such as a cathode ray tube (CRT), liquid crystal display, active matrix display, or plasma display, for displaying information to a computer user. An input device 713, such as a keyboard including alphanumeric and other keys, is coupled to the bus 701 for communicating information and command selections to the processor 703. Another type of user input device is a cursor control 715, such as a mouse, a trackball, or cursor direction keys, for communicating direction information and command selections to the processor 703 and for controlling cursor movement on the display 711.

According to one embodiment of the invention, the processes described herein are performed by the computer system 700, in response to the processor 703 executing an arrangement of instructions contained in main memory 705. Such instructions can be read into main memory 705 from another computer-readable medium, such as the storage device 709. Execution of the arrangement of instructions contained in main memory 705 causes the processor 703 to perform the process steps described herein. One or more processors in a multi-processing arrangement may also be employed to execute the instructions contained in main memory 705. In alternative embodiments, hard-wired circuitry may be used in place of or in combination with software instructions to implement the exemplary embodiment. Thus, exemplary embodiments are not limited to any specific combination of hardware circuitry and software.

The computer system 700 also includes a communication interface 717 coupled to bus 701. The communication interface 717 provides a two-way data communication coupling to a network link 719 connected to a local network 721. For example, the communication interface 717 may be a digital subscriber line (DSL) card or modem, an integrated services digital network (ISDN) card, a cable modem, a telephone modem, or any other communication interface to provide a data communication connection to a corresponding type of communication line. As another example, communication interface 717 may be a local area network (LAN) card (e.g. for Ethernet™ or an Asynchronous Transfer Model (ATM) network) to provide a data communication connection to a compatible LAN. Wireless links can also be implemented. In any such implementation, communication interface 717 sends and receives electrical, electromagnetic, or optical signals that carry digital data streams representing various types of information. Further, the communication interface 717 can include peripheral interface devices, such as a Universal Serial Bus (USB) interface, a PCMCIA (Personal Computer Memory Card International Association) interface, etc. Although a single communication interface 717 is depicted in FIG. 7, multiple communication interfaces can also be employed.

The network link 719 typically provides data communication through one or more networks to other data devices. For example, the network link 719 may provide a connection through local network 721 to a host computer 723, which has connectivity to a network 725 (e.g. a wide area network (WAN) or the global packet data communication network now commonly referred to as the "Internet") or to data equipment operated by a service provider. The local network 721 and the network 725 both use electrical, electromagnetic, or optical signals to convey information and instructions. The signals through the various networks and the signals on the network link 719 and through the communication interface 717, which communicate digital data with the computer system 700, are exemplary forms of carrier waves bearing the information and instructions.

The computer system 700 can send messages and receive data, including program code, through the network(s), the network link 719, and the communication interface 717. In the Internet example, a server (not shown) might transmit requested code belonging to an application program for implementing an exemplary embodiment through the network 725, the local network 721 and the communication interface 717. The processor 703 may execute the transmitted code while being received and/or store the code in the storage device 709, or other non-volatile storage for later execution. In this manner, the computer system 700 may obtain application code in the form of a carrier wave.

The term "computer-readable medium" as used herein refers to any medium that participates in providing instructions to the processor 703 for execution. Such a medium may take many forms, including but not limited to non-volatile media, volatile media, and transmission media. Non-volatile media include, for example, optical or magnetic disks, such as the storage device 709. Volatile media include dynamic memory, such as main memory 705. Transmission media include coaxial cables, copper wire and fiber optics, including the wires that comprise the bus 701. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the various exemplary embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A method comprising:
   automatically playing a particular ringtone in a communication device of a callee-user when receiving a call from a caller after:
   receiving a ringtone schedule through a web application over a data network from said callee-user, to enable said playing of said particular ringtone for said callee-user;
   storing, by said callee-user, said received ringtone schedule in said communication device, said schedule specifying a group of parameters to a plurality of ringtones;
   automatically invoking one of said ringtones corresponding to said particular ringtone based on certain parameters selected from said group of said parameters consisting of location of said callee-user, time of day, day of week, type of said caller, priority of said call and origin of said call; and
   receiving an external control signal from a source other than said caller or said callee-user when said location of said callee-user is a particular location and location of said source is also said particular location, said external control signal controlling said particular ringtone to be an influenced ringtone compatible with said particular location while said callee-user is at said particular location and said control signal allowing said influenced ringtone to return to said particular ringtone when said location of said callee-user is no longer said particular location.

2. A method according to claim 1, wherein the communication device includes a mobile device configured to establish a voice connection.

3. A method according to claim 1, further comprising:
   receiving the ringtone schedule through an input device of the mobile device.

4. A method according to claim 1, wherein the location is determined by using a Global Positioning System (GPS) receiver.

5. An apparatus comprising:
   a communication device of a callee-user automatically playing a particular ringtone when receiving a call from a caller, said communication device comprising:
   a memory configured to store a ringtone schedule received through a web application over a data network from said callee-user, to enable said playing of said particular ringtone for said callee-user, said ringtone schedule specifying a group of parameters for a plurality of ringtones;
   a ringtone scheduler configured to automatically select one of the ringtones corresponding to said particular ringtone for playout based on certain parameters selected from said group of parameters consisting of location of said callee-user, time of day, day of week, type of said caller, priority of said call and origin of said call and to receive an external control signal from a source other than said caller or said callee-user when said location of said callee-user is a particular location and location of said source is also said particular location, said external control signal controlling said particular ringtone to be an influenced ringtone compatible with said particular location while said callee-user is at said particular location and said control signal allowing said influenced ringtone to return to said particular ringtone when said location of said callee-user is no longer said particular location; and
   an audio interface configured to playout the selected or influenced ringtone.

6. An apparatus according to claim 5, further comprising:
   an input device configured to receive the ringtone schedule.

7. An apparatus according to claim 5, further comprising:
   a transceiver configured to receive the ringtone schedule as input to said memory through a web-application over a data network.

8. An apparatus according to claim 5, further comprising:
   a locator configured to determine location of the apparatus.

9. An apparatus according to claim 8, wherein the location is determined by using a Global Positioning System (GPS) receiver.

10. A system comprising:
    a database configured to store a ringtone schedule, received from a user of a mobile device capable of receiving a call from a caller, said schedule specifying a group of parameters for a plurality of ringtones, said ringtone schedule received through a web application over a data network from said user to enable playing of one of said plurality of ringtones for said user; and
    a processor configured to automatically select said one of the ringtones for playout by said mobile device based on certain parameters selected front said group of parameters consisting of location of said user, time of day, day of week, type of said caller, priority of said call and origin of said call and to receive an external control signal from a source other than said caller or said user when said location of said user is a particular location and location of said source is also said particular location, said external control signal controlling said selected ringtone to be an influenced ringtone compatible with said particular location while said user is at said particular location and said control signal allowing said influenced ringtone to return to said selected ringtone when said location of said user is no longer said particular location.

11. A system according to claim 10, further comprising:
    an interface configured to receive the ringtone schedule through an input device of the mobile device.

12. A system according to claim 10, further comprising:
an interface configured to receive the ringtone schedule through a web-application over a data network.

13. A system according to claim 10, further comprising:
an interface configured to receive Location of the mobile device.

14. A system according to claim 13, wherein the location is determined by using a Global Positioning System (GPS) receiver.

15. A method comprising:
receiving a ringtone schedule through a web application over a data network from a callee-user to enable playing, for said callee-user, a particular ringtone selected from a plurality of ringtones in a said schedule;

automatically changing a current ringtone in a callee-user's mobile device to said particular ringtone provided by said callee-user when receiving a call from a caller, said particular ringtone being suitable to a schedule of said user, said suitability based on certain parameters selected from a group of parameters consisting of location of said callee-user, time of day, day of week, type of said caller, priority of said call and origin of said call; and receiving an external control signal from a source other than said caller or said callee-user when said callee-user is located within a restricted ringtone-usage environment and said source is also located within said environment, said external control signal controlling said particular ringtone to be influenced ringtone compatible with said environment while said caller-user is within said environment and said control signal allowing said influenced ringtone to return to said particular ringtone when said caller-user is no longer within said environment.

\* \* \* \* \*